UNITED STATES PATENT OFFICE.

SAMUEL LEWIS SUMMERS, OF PHILADELPHIA, PENNSYLVANIA.

ALKALI SALTS OF METHYLENE DISALICYLIC ACID AND PROCESS OF MAKING SAME.

SPECIFICATION forming part of Letters Patent No. 716,591, dated December 23, 1902.

Application filed June 14, 1902. Serial No. 111,731. (No specimens.)

*To all whom it may concern:*

Be it known that I, SAMUEL LEWIS SUMMERS, a citizen of the United States, residing in the city of Philadelphia, State of Pennsylvania, have invented and discovered certain new and useful Alkali Salts of Methylene Disalicylic Acid and Process of Producing the Same, of which the following is a full, clear, and exact description.

My invention relates to a new chemical compound having especial utility as a pharmaceutical product by reason of its therapeutic value in certain cases. Administered as an internal medicine in doses of from five to fifteen grains, varying according to condition of patient, it is a valuable remedy in cases of uric-acid diathesis.

The new body is generically an alkali salt of methylene disalicylic acid and comprises the individuals in that class—for example, the lithium salt, the ammonium salt, the potassium salt, and the sodium salt, representing the class of alkali salts.

In a former application for Letters Patent filed by me April 26, 1902, Serial No. 104,821, I have described and claimed the acid body to be acted on herein—namely, the methylene disalicylic acid—which will be found fully described in the specification attached to said application and which therefore need not be further described herein, save to say that it is a crystalline body composed of two salicylic-acid molecules deprived of one hydrogen atom in each salicylic-acid group and chemically united or held together by the methylene group.

My present invention consists in the production of the alkali salts of this body, and comprises such salts as a new class of products and the process by which I produce them.

In carrying out my invention practically I first prepare a volume of three hundred parts of water, in which is suspended two hundred and eighty-eight parts of the methylene disalicylic acid, the latter being insoluble in water. To this is added 73.54 parts of pure lithium carbonate for the production of the lithium salt of methylene disalicylic acid. It is a white amorphous powder, somewhat granular in structure, deliquescent and soluble in water and alcohol, insoluble in ether and benzene, and forms from the solution aforesaid when evaporated to dryness. Its formula is $C_{13}H_{10}O_2(COOLi)_2$. An analogous reaction takes place if 105.4 parts of pure sodium carbonate be substituted for the lithium salt and treated in the same way, resulting in the production of the sodium salt of methylene disalicylic acid having the same identifying characteristics above stated and the formula $C_{13}H_{10}O_2(COONa)_2$. An analogous reaction also takes place if 137.2 parts of pure potassium carbonate is substituted for the lithium or sodium salts and is treated in the same way, save that a much less quantity than three hundred parts of water—say one-third—is sufficient. The resultant is the potassium salt of methylene disalicylic acid having the same identifying characteristics above stated and the formula $C_{13}H_{10}O_2(COOK)_2$. An analogous reaction also takes place if 120.7 parts of a solution containing twenty-eight per cent. of ammonia-gas be substituted for the lithium, potassium, or sodium salts and treated in the same way, save that the methylene disalicylic acid should be suspended in about one-third the quantity of water first stated. The ammonium acts chemically as an alkali metal, and the resultant is the ammonium salt of methylene disalicylic acid having the same identifying characteristics as the other three species described and the formula $C_{13}H_{10}O_2(COONH_4)_2$.

In lieu of the specific formulæ stated a general formula covering the four individual salts in the class may be given as $C_{15}H_{10}O_6(R')_2$, in which R' represents a monovalent alkali metal.

Having thus described my invention, what I claim as new, and desire to secure by Letters Patent, is—

1. The new product described, which is an alkali salt of methylene disalicylic acid, an amorphous powder, nearly white, soluble in water and alcohol, insoluble in benzene and ether, and having the formula $C_{15}H_{10}O_6(R')_2$, in which R' represents a monovalent alkali metal.

2. The process described of producing the alkali salts of methylene disalicylic acid which consists in suspending methylene disalicylic acid in water, allowing an alkali to react thereon, and then evaporating the solution to dryness, substantially as described.

3. The process described of producing an alkali salt of methylene disalicylic acid, which consists in suspending methylene disalicylic acid in water, allowing ammonium hydrate to react thereon, and then evaporating the solution to dryness, substantially as described.

In testimony whereof I have hereunto affixed my signature this 9th day of June, A. D. 1902.

SAMUEL LEWIS SUMMERS.

Witnesses:
  WAYNE P. RAMBO,
  FRANCIS RAMBO.